Figure 1:
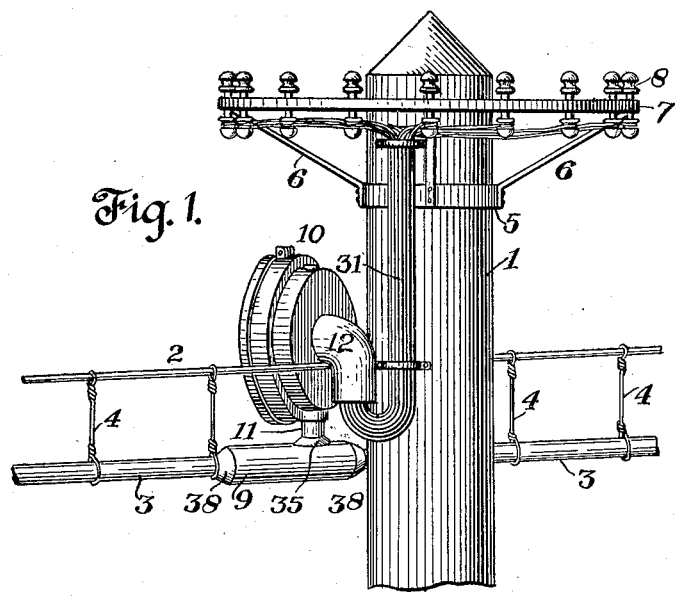

T. B. FARMER.
CABLE TERMINAL BOX FOR TELEPHONE SYSTEMS.
APPLICATION FILED NOV. 22, 1909.

1,033,065.

Patented July 16, 1912.
2 SHEETS—SHEET 1.

Witnesses
H. F. Löwenstein
James H. Marr

Inventor
Thomas B. Farmer
By Edward E. Clement
Attorney

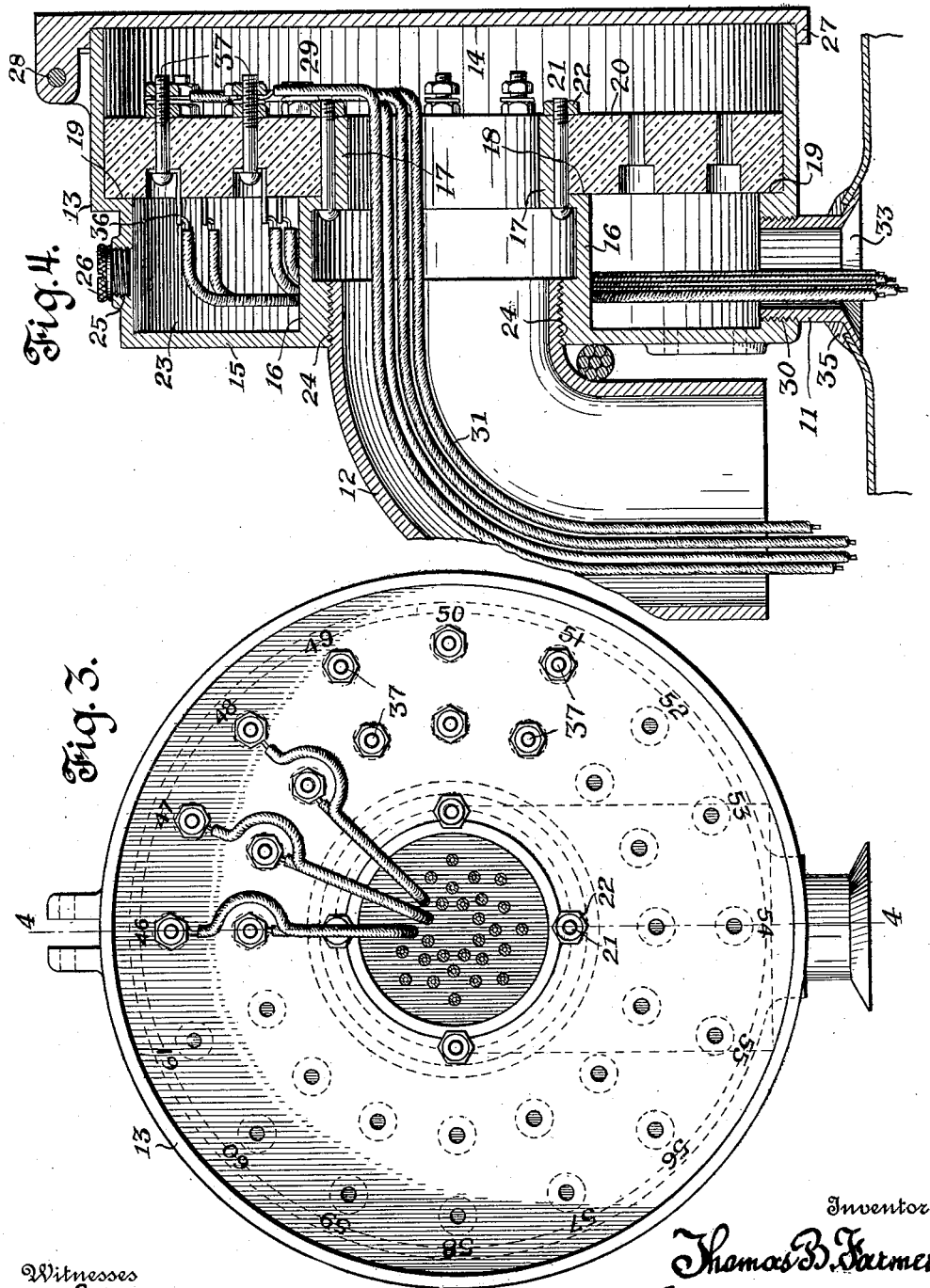

UNITED STATES PATENT OFFICE.

THOMAS BENJAMIN FARMER, OF BALTIMORE, MARYLAND.

CABLE-TERMINAL BOX FOR TELEPHONE SYSTEMS.

1,033,065.   Specification of Letters Patent.   Patented July 16, 1912.

Application filed November 22, 1909. Serial No. 529,498.

*To all whom it may concern:*

Be it known that I, THOMAS BENJAMIN FARMER, a citizen of the United States, residing at Baltimore and State of Maryland, have invented certain new and useful Improvements in Cable-Terminal Boxes for Telephone Systems, of which the following is a specification, reference being had therein to the accompanying drawing.

My invention relates to cable terminals, and has for its object the production of efficient and economical means for effecting a waterproof and airtight junction between open wires and the inclosed wires in a cable.

My invention is especially applicable to aerial cable but is not necessarily limited thereto. Such cable is usually supported by hangers or clips from a steel messenger wire, which in turn is supported by poles or other rigid agencies. In bringing out wires from the cable at points intermediate its ends, it has been common practice to cut out a section of the lead sheath of the cable and put on a sleeve with one end expanded to accommodate not only the main cable, but also a branch or "tap" cable, the latter passing to a nipple or sleeve on a junction box secured to the nearest pole. The joints between the sleeve and cable sheaths as well as between the tap sheath and the junction box, are wiped as usual, and all the tap wires are spliced and the splices separately wrapped inside the main sleeve. Such construction is subject to numerous drawbacks, and is quite expensive. In the present case I dispense with the tap cable entirely, and instead I provide a flared nipple or sleeve on my terminal box which enters the upper part of the main cable sleeve and is soldered thereto. The tap wires when spliced are led directly into the terminal box, and are very short. That portion of the box which communicates with the cable sleeve is filled solidly with ozite after the mechanical work is finished and the tap wires connected onto their terminals. Thus no possible chance is left for the admission of air or water to the cable, and even should the soldered joints become imperfect and slightly leaky, this condition would still be maintained.

My terminal box itself is circular in figure, and contains a porcelain ring through which extend terminals which march in pairs in clockwise order around the ring. The cable tap wires are soldered to the rear or inside ends of these terminals, while the aerial or open wires are connected to their front ends and pass thence through the center of the ring and of the box to the rear where they drop out through an elbow. The front of the box is closed by means of a waterproof cover, and is conveniently supported on the messenger wire by hooking the elbow over the latter. In some cases however I may secure the box directly to a pole and dispense with the elbow, although I consider this arrangement not so good as the first. Two very important points to be noted in this arrangement are, first, that I tap the cable directly, carrying what are practically extensions of the cable wires to their terminals in the box; and second, that by arranging the terminals in circular order and taking out the aerial wires through the center changes can be made, and any particular wire connected to any particular terminal without splicing or changing the length thereof. So far as I know it has heretofore been impossible to effect direct taps intermediate of the ends of a cable, hence I shall claim my means broadly. As regards the centralizing of outgoing wires with respect to the terminals, this dispenses with the necessity of drilling a hole to allow branch aerial wires to enter the terminal, and also keeps all these wires of the same length, so as to permit their interchange at will as already stated. The means to this end will also be broadly claimed.

My invention is illustrated in the accompanying drawings in which—

Figure 2:
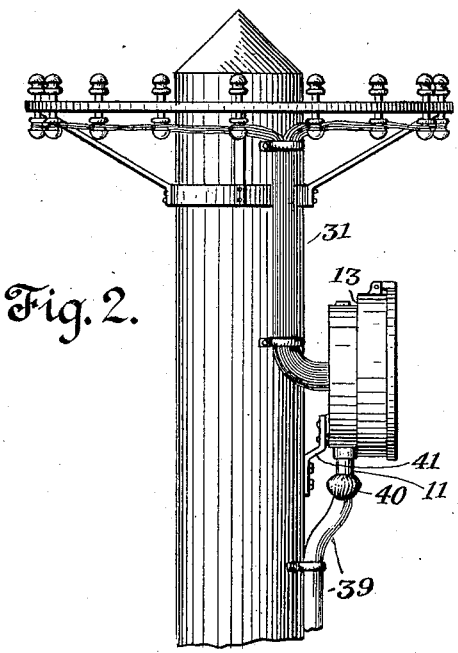
Figure 5:
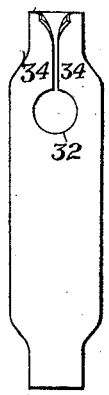

Figure 1 is a perspective view showing the upper part of a pole, portions of a messenger wire and cable, and a branch terminal for the latter embodying my invention. Fig. 2 is a similar view showing a modified form of terminal. Fig. 3 is a face view of the terminal box opened, with some of the terminals removed. Fig. 4 is a sectional view on the line 4—4 of Fig. 3. Fig. 5 is a top plan view of the main cable sleeve, showing method of preparing it to receive the nipple of the terminal box.

Referring to the drawings, and especially to Fig. 1 thereof, 1 designates a pole, 2 a messenger wire supported thereby, and 3 a cable which is hung from the messenger wire by means of hangers 4. Near the top of the pole a collar 5 is fitted from which branch radial arms 6 carrying a distributing ring 7, provided with the usual insulators 8. The problem with which this invention has to do is that of effecting connection from the cable 3 to the open wire leads or drops on the ring 7. Heretofore as already stated, such connection has generally been effected by means of a tap cable passing out of the main sleeve 9 to a terminal box on the pole. By the use of my invention however I am able to dispense with this branch or tap cable and all its connections and carry the tap wires from the cable 3 directly into the terminal box 10, which is hung upon the messenger wire 2. The lead sheath of the cable is cut where this connection is to be effected, the sleeve 9 slipped on, and a short flaring nipple 11 on the box is secured directly to the sleeve. The open wire leads or chambers are brought out of an elbow 12 fitted to the back of the box, looped around and carried up to the ring 7, this elbow serving also as a convenient means for supporting the box on the messenger. Thus the parts 3, 9, 10, 11, 12, together form an integral structure, and the box can be treated as a permanent part or attachment of the cable quite as much as the sleeve 9, being equally protected in every respect.

The structure of my terminal box itself is best shown in Figs. 3 and 4, to which reference should now be had. In these figures, 13 designates a cylindrical shell open at its front end 14 but cast with an integral annular bottom 15 having a reëntrant central cylindrical flange or collar 16 extending forwardly through the interior of the shell and reduced in diameter at 17 to leave an annular shoulder 18 in the same plane with a similar shoulder 19 extending around the inside of the shell. A flat porcelain ring 20 is fitted snugly to the shell and collar 17, and bridges across the shoulders 18 and 19 all the way around, and is held in position by means of through bolts 21 carrying nuts 22 accessible from the front of the box when open. The elbow 12 is threaded at 24 into the collar 16. The effect of this construction is to form two chambers in the box, one at 29 in front of the porcelain ring or partition 20, and the other behind it at 23. The rear chamber 23 is sealed except for the two openings 25 and 30, the former serving for the introduction of ozite or other similar composition and the latter for the attachment of the nipple 11 heretofore mentioned. The front chamber 29 contains the working terminals, from which the open wires 31 pass through the central opening or tube to the rear and out through the elbow. This chamber is closed by the waterproof door or lid 27, shown hinged at 28 to a pair of lugs on the upper part of the shell. Obviously it may be provided with a rubber gasket and suitable form of lock if desired.

In the box illustrated there are sixteen pairs of terminals, which in Fig. 3 are numbered from 46 to 61 inclusive. This numbering is arbitrary and merely illustrative of the method employed. The essential point to be observed is that the circular arrangement of the terminals in radial pairs enables a clockwise progression to be adopted which is not only economical in the matter of wiring, but renders it very easy to identify the terminals at any time and under all conditions. In applying this terminal box to a cable the sleeve 9 is first slit from one end as shown in Fig. 5 and a circular opening 32 cut of a diameter somewhat less than the extreme diameter of the flange 33 of the nipple 11. The flaps 34 are then turned back, the nipple introduced, the flaps closed and soldered together, and the edges of the sleeve around the opening 32 soldered at the flange of the nipple as indicated at 35 in Figs. 1 and 4. The tap wires having then been spliced and the splices wrapped, the sleeve is slipped over the exposed portion of the cable and the taps 31 are brought up directly through the nipple 11 and the annular trough or chamber 23 and soldered in regular order to the tailed wipers 36 attached to the rear ends of the terminal bolts 37 carried on the porcelain ring. In order to permit this soldering the nuts 22 are removed from the holding bolts 32 and the porcelain ring taken out and inclined forwardly so as to get at its rear face. After all the wires 31 are connected to the terminals, the ring is pushed back in position and the nuts 22 replaced as shown in Fig. 4. The sleeve 9 having been connected to the cable sheath by wiped joints 38, it is apparent that the space within the sleeve 9, nipple 11 and the trough 23 form one continuous closed chamber. This is effectually sealed by means of ozite or similar composition introduced in a liquid or semi-liquid state through the opening 25, the chamber 23 being completely filled thereby, as well as any space that may be left around the wires in the nipple and the entrance to the sleeve. The plug 26 is then screwed down, and the box is ready for use. Any desired tap wire from the cable may be reached through exposed terminals 37, not only without disturbing the cable connection, but without confusion or complication due to the open wire leads, since all of these pass out at the back of the box.

In Fig. 2 I have shown a modification of the foregoing arrangement, in which a cable 39 is brought up to the nipple 11 and secured thereto by means of a wiped joint 40. The inside connections and arrangements in the box are the same as before, but the elbow 12 is dispensed with and the wires 31 are taken directly out from the tube 16, being preferably dropped a little so as to form a drip loop before passing upwardly. The box in this case is supported on a bracket 41. This arrangement enables the box to be used as a pole top terminal for any form of cable, and for connections either intermediate or terminal.

It will be apparent from the foregoing description that a number of changes might be made without departing from the spirit of my invention. A distributing terminal of this kind finds a very wide field of applicability, and its uses must largely determine its specific form and arrangement. The principal and characteristic feature of the invention resides in the division of the body into two chambers, one of which is sealed for the incoming wires from the cable while the other is open for the outgoing open wires; access to both chambers being from the rear and access to the terminals from the front. It will be noted that not only does this arrangement make for great efficiency, but also for extreme economy of space, which means economy in size, weight and cost.

Having the foregoing and characteristic features in view, I desire it understood that I contemplate all such non-essential changes as properly fall within the scope of the appended claims.

I do not claim herein the slit sleeve as such or the method of forming the same, but make the same the subject of a separate application filed as a division hereof.

Having thus described my invention what I claim and desire to secure by Letters Patent is—

1. A cable terminal box comprising a body, an insulating partition therein forming front and rear chambers, terminals carried on the partition with their opposite ends exposed in the respective chambers, means for connecting the rear chamber with the interior of a sheathed cable, and a central tubular duct extending from the front chamber through the rear chamber to the rear of the body, substantially as described.

2. A cable terminal box comprising a hollow body, an insulating partition therein forming front and rear chambers, means for sealing the body to a sheathed cable with one chamber communicating directly with the interior of the cable sheath, terminals extending through the partition with their opposite ends exposed in the respective chambers, a removable closure for the unsealed chamber, and a conduit extending therefrom to the rear of the body, substantially as described.

3. A cable terminal box comprising a hollow body or shell, having a closed back, an open front, and a tubular flanged duct extending from the back part way through the body, an insulating partition fitted within the body and provided with a central opening receiving the forward end of said duct, forming a closed annular chamber behind the partition, and an open chamber in front thereof, terminals secured in the partition with their opposite ends exposed in the respective chambers, a coupling device attached to the body and adapted to connect the same to a sheathed cable with said annular chamber communicating directly with the interior of the cable sheath, and a removable closure for the front of the body or shell, substantially as described.

4. A cable terminal box comprising a hollow body or shell having an open front and a closed back with a central opening provided with an integral collar forming a tubular duct extending forwardly part way through the body, an insulating partition fitted within and to the body, with a central opening receiving the forward end of said tubular duct, forming a closed annular chamber behind the partition and an open chamber in front thereof, terminals secured in the partition with their opposite ends exposed in the respective chambers, and arranged in radial pairs marching in circular order around the central opening, a coupling device attached to the body and adapted to connect the same to a sheathed cable with said annular chamber communicating directly with the interior of the cable sheath, and a removable closure for the front of the body or shell, substantially as described.

5. A cable terminal box comprising a hollow body or shell having an open front and a closed back with a central opening provided with an integral collar forming a tubular duct extending forwardly part way through the body, an insulating partition fitted within and to the body, with a central opening receiving the forward end of said tubular duct, forming a closed annular chamber behind the partition and an open chamber in front thereof, terminals secured in the partition with their opposite ends exposed in the respective chambers, and arranged in radial pairs marching in circular order around the central opening, a coupling device attached to the body and adapted to connect the same to a sheathed cable with said annular chamber communicating directly with the interior of the cable sheath, and a removable closure for the front of the body or shell, all in combination with said cable, tap wires therefrom leading directly into the closed annular chamber and therein severally connected with the exposed ends of the terminals, and open wire connections from the opposite ends of the terminals extending through the central conduit out of the back of the body and thence distributed, substantially as described.

6. A cable terminal box comprising a hollow shell or body, an insulating partition dividing the interior thereof into two chambers, a coupling in one side of the body communicating with one chamber, a conduit extending through said chamber into the second chamber, and terminals extending through said partition with their opposite ends exposed in the respective chambers, said coupling adapted for direct attachment to a cable sheath, and to pass wires therefrom into its chamber, for connection on the cable side of said terminals, and said conduit adapted to pass wires from the other ends of said terminals through the body to the outside thereof, substantially as described.

7. A cable terminal box comprising a water tight shell containing terminals, and a nipple or coupling having a flaring end, in combination with a sheathed cable having a lateral opening in its sheath to receive the coupling, with edges overlying the flaring portion thereof and sealed thereto, substantially as described.

8. A hermetically sealed terminal box, a sheathed cable, and lateral connecting means therefor comprising a sleeve on the cable having an opening in its side, and a projecting tubular nipple on the box with an end flange adapted to be received in said opening and underlie the edges thereof, together with means for sealing the sleeve to the nipple, substantially as described.

9. A terminal box for aerial cable comprising a body or shell, peripheral means for securing the same to the side of a cable sheath, terminals for wires led through said means from the cable, and a central projecting wire conduit leading from a point adjacent to said terminals to a point without the box, substantially as described.

10. A terminal box for aerial cable comprising a substantially cylindrical body having a closed back, an open front with a detachable cover, a coupling in its periphery for direct attachment to a cable sheath, and a tubular elbow projecting from its back and serving the double purpose of supporting the box on the messenger wire and for the egress of open branch wires, substantially as described.

11. The combination of a lead covered cable, and a terminal box in proximity thereto having a hermetically sealed interior wire receiving cavity in direct communication with the interior of the cable intermediate of its ends through a sealed joint comprising a flanged nipple or coupling connected to a wall of the box, with its flanged end entering the side of the cable sheath, the edges thereof all around being inclosed and sealed between the flange on which they rest and external sealing material superimposed thereon, substantially as described.

12. A terminal box comprising a body or shell, a partition dividing the interior of the shell into two chambers, a series of terminals arranged in circular order on each face of the partition, electrical connections extending through the partition and connecting the terminals in corresponding pairs, and a central conduit extending from a central opening in the partition through one of the chambers and affording direct access from the other chamber to the outside of the shell, substantially as described.

13. A cable terminal box comprising a shell or body containing two chambers, a series of terminals supported in but insulated from the shell with exposed ends lying in the respective chambers, and a tubular conduit extending from one chamber through the other chamber to the outside of the shell, substantially as described.

14. A cable terminal box comprising a hollow shell or body containing two separate closed chambers, terminals in the respective chambers electrically connected in pairs, and a conduit extending from one chamber through the other to the outside of the shell, substantially as described.

In testimony whereof I affix my signature in presence of two witnesses.

THOMAS BENJAMIN FARMER.

Witnesses:
JACOB SLINE,
JAMES H. MARR.

Copies of this patent may be obtained for five cents each, by addressing the "Commissioner of Patents, Washington, D. C."